United States Patent
Thornton et al.

(10) Patent No.: US 10,182,484 B1
(45) Date of Patent: Jan. 15, 2019

(54) SURGE SUPPRESSION MONITORING FOR LIGHTING FIXTURES AND OTHER ELECTRONICS

(71) Applicant: Cree, Inc., Durham, NC (US)

(72) Inventors: Gerry Farrel Thornton, Morrisville, NC (US); Xin Jiang, Long Grove, IL (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/958,554

(22) Filed: Apr. 20, 2018

(51) Int. Cl.
H05B 33/08 (2006.01)
H05B 37/02 (2006.01)
F21Y 115/10 (2016.01)

(52) U.S. Cl.
CPC ..... *H05B 33/0884* (2013.01); *H05B 33/0842* (2013.01); *H05B 37/02* (2013.01); *F21Y 2115/10* (2016.08)

(58) Field of Classification Search
CPC ............ H05B 33/0815; H05B 33/0818; H05B 33/0884; H05B 33/0809; H05B 33/0848; H05B 33/0896; H05B 37/0245; H05B 37/0254; H05B 33/0863; H05B 33/0872; H05B 33/0803; H05B 37/0272; H05B 33/0857; H05B 33/0887
See application file for complete search history.

(56) References Cited

U.S. PATENT DOCUMENTS

| 9,049,753 B1* | 6/2015 | Wassel | H05B 37/02 |
| 2009/0207034 A1* | 8/2009 | Tinaphong | H02H 9/042 340/635 |
| 2009/0251148 A1* | 10/2009 | Finlay, Sr. | G01R 31/14 324/424 |

* cited by examiner

*Primary Examiner* — Douglas W Owens
*Assistant Examiner* — Syed M Kaiser
(74) *Attorney, Agent, or Firm* — Withrow & Terranova, P.L.L.C.

(57) ABSTRACT

A technique for determining when to replace protection circuitry in electronic devices, such as lighting fixtures, is provided. Protection circuitry is provided between AC supply rails and in front of circuitry to be protected. A protection circuit sensor is located and configured to measure a characteristic of the protection circuitry and provide a corresponding sensor output. Control circuitry will monitor the sensor output of the protection circuit sensor on a continuous, periodic, or aperiodic basis. Next, the control circuitry will determine at least one metric indicative of an extent of damage inflicted on the protection circuitry 30 based on the sensor output. Based on the at least one metric, the control circuitry will determine when the at least one metric exceeds a threshold indicative of a need to replace the protection circuitry while the protection circuitry remains operational.

33 Claims, 11 Drawing Sheets

SURGE SUPPRESSION MONITORING FOR LIGHTING FIXTURES AND OTHER ELECTRONICS

FIELD OF THE DISCLOSURE

The present disclosure relates to surge protection for lighting fixtures and other electronics, and in particular to determining when such surge protection needs to be replaced.

BACKGROUND

In recent years, a movement has gained traction to replace incandescent light bulbs with lighting fixtures that employ more efficient lighting technologies, as well as to replace relatively efficient fluorescent and high intensity discharge (HID) lighting fixtures with lighting technologies that produce a more pleasing, natural light. One such technology that shows tremendous promise employs light emitting diodes (LEDs) as the light source. Compared with incandescent bulbs, LED-based light fixtures are much more efficient at converting electrical energy into light, are longer lasting, and are also capable of producing light that is very natural. Compared with fluorescent and/or HID lighting, LED-based fixtures are still significantly more efficient and capable of producing light that is much more natural and more capable of accurately rendering colors. As a result, lighting fixtures that employ LED technologies are replacing incandescent, fluorescent, and HID bulbs in residential, commercial, and industrial applications.

LED-based fixtures generally employ relatively complex power supplies and control circuitry, which are collectively referred to as drivers, to convert an AC supply voltage to a DC supply voltage that is used to power the LEDs and the other electronics of the LED-based fixtures. In addition to providing the DC supply voltage, the drivers control how the LEDs are driven in an effort to provide light for general illumination at the appropriate intensity, color, and color temperature. As with most electronics, these drivers often require surge protection circuitry to prevent voltage or current spikes from damaging or destroying the electronics of the driver and/or the associated LEDs.

Metal Oxide Varistors (MOVs) are often used to provide surge protection for LED-based fixtures and other types of electronics. One or more MOVs are generally coupled between the AC supply lines and function to clamp voltage spikes, which are referred to herein as overvoltage events, to an acceptable level. Unfortunately, the MOVs degrade with each successive overvoltage event and ultimately fail after being exposed to a relatively few number of overvoltage events. For example, commonly used MOVs often fail after being subjected to only six to eight overvoltage events. Once the MOV fails, the MOV provides no protection for overvoltage events. As such, there is a need for a way to provide an alert indicative of an MOV being damaged or needing to be replaced prior to the MOV actually failing.

SUMMARY

A technique for determining when to replace protection circuitry in electronic devices, such as lighting fixtures, is provided. Protection circuitry is provided between AC supply rails and in front of circuitry to be protected. A protection circuit sensor is located and configured to measure a characteristic of the protection circuitry and provide a corresponding sensor output. Control circuitry will monitor the sensor output of the protection circuit sensor on a continuous, periodic, or aperiodic basis. Next, the control circuitry will determine at least one metric indicative of an extent of damage inflicted on the protection circuitry 30 based on the sensor output. Based on the at least one metric, the control circuitry will determine when the at least one metric exceeds a threshold indicative of a need to replace the protection circuitry while the protection circuitry remains operational.

The sensor output may be indicative of a temperature, current, voltage, or the like of the protection circuitry. Exemplary, but non-limiting, temperature-based metrics that are indicative of damage inflicted on the MOV protection circuitry may correspond directly to or be a function of one or more of:

- a number of times a particular temperature has been exceeded;
- a defined temperature of the protection circuitry has been reached (or exceeded) during one or more of the surge events;
- a rise time of the temperature of the protection circuitry is less than a threshold during one or more of the surge events;
- an amount of time the temperature of the protection circuitry remains above a threshold temperature during one or more of the surge events;
- the temperature of the protection circuitry remains above a set level after the a surge event occurs, or after the surge event has ended; and
- an amount of temperature-related energy associated with one or more of the surge events.

The latter of which corresponds to an integral of temperature over time for a single event or over multiple events.

The temperature-based metrics may be analyzed individually or in combination in a variety of ways to determine whether the protection circuitry is damaged to a point of needing replaced. For example, the metric could be a function of a peak temperature reached by the protection circuitry during at least one of the surge events and a rise time of the temperature of the protection circuitry during at least one of the surge events. The function could be based on set thresholds being exceeded and/or differences between successive metrics exceeding or being less than set thresholds. A function of two or more of the metrics for a single overvoltage event or over multiple overvoltage events may be used to generate the metric. The functions may be linear, non-linear, or logic based.

In one embodiment, a lighting fixture includes control circuitry, a light source for general illumination, and an AC input associated with a first rail and a second rail. Protection circuitry is coupled between the first rail and the second rail and configured to suppress surge events occurring at the first rail and the second rail. A protection circuitry sensor is associated with the protection circuitry and configured to provide a sensor output that monitors at least one characteristic, such as temperature or current, associated with the protection circuitry.

The control circuitry is configured to drive the light source and monitor the sensor output. The control circuitry is further configured to:

- determine at least one metric indicative of an extent of damage inflicted on the protection circuitry due to at least one surge event based on the sensor output;
- determine when the at least one metric meets a threshold indicative of a need to replace the protection circuitry while the protection circuitry remains operational; and when the at least one metric meets the threshold, provide information indicative of the need to replace the protection circuitry.

In one embodiment, the at least one characteristic is temperature and the surge events are overvoltage events. The sensor output corresponds to a temperature of the protection circuitry. The control circuitry is further configured to identify the surge events based at least in part on the sensor output. The at least one metric may corresponds to a number of the surge events that have occurred, and the threshold may correspond to a number of surge events that must occur prior to proving the information indicative of the need to replace the protection circuitry.

In another embodiment, the at least one characteristic is current flowing through the protection circuitry, and the sensor output corresponds to the current flowing through the protection circuitry.

The lighting fixture may include a status indicator capable of providing a human perceptible signal, and wherein to provide the information indicative of the need to replace the protection circuitry, the control circuitry is further configured to provide the human perceptible signal via the status indicator to indicate the need to replace the protection circuitry. The status indicator may be an LED or the like.

To provide the information indicative of the need to replace the protection circuitry, the control circuitry may be further configured to control the light source in a defined manner that is indicative of the need to replace the protection circuitry.

The lighting fixture may include a user interface capable of providing a human perceptible signal. To provide the information indicative of the need to replace the protection circuitry, the control circuitry may be further configured to provide the human perceptible signal via the user interface to indicate the need to replace the protection circuitry.

The lighting fixture may include a communication interface capable of communicating in a wired or wireless manner with a remote entity. To provide the information indicative of the need to replace the protection circuitry, the control circuitry may be further configured to provide an alert or other information that indicates the need to replace the protection circuitry to the remote entity via the communication interface.

The protection circuitry may be provided in a readily replaceable module that releasably engages the lighting fixture such that the module is readily replaceable with a new module.

The control circuitry may be further configured to determine when the protection circuitry has actually failed based on the sensor output and provide an alert indicating that the protection circuitry has failed.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 4:
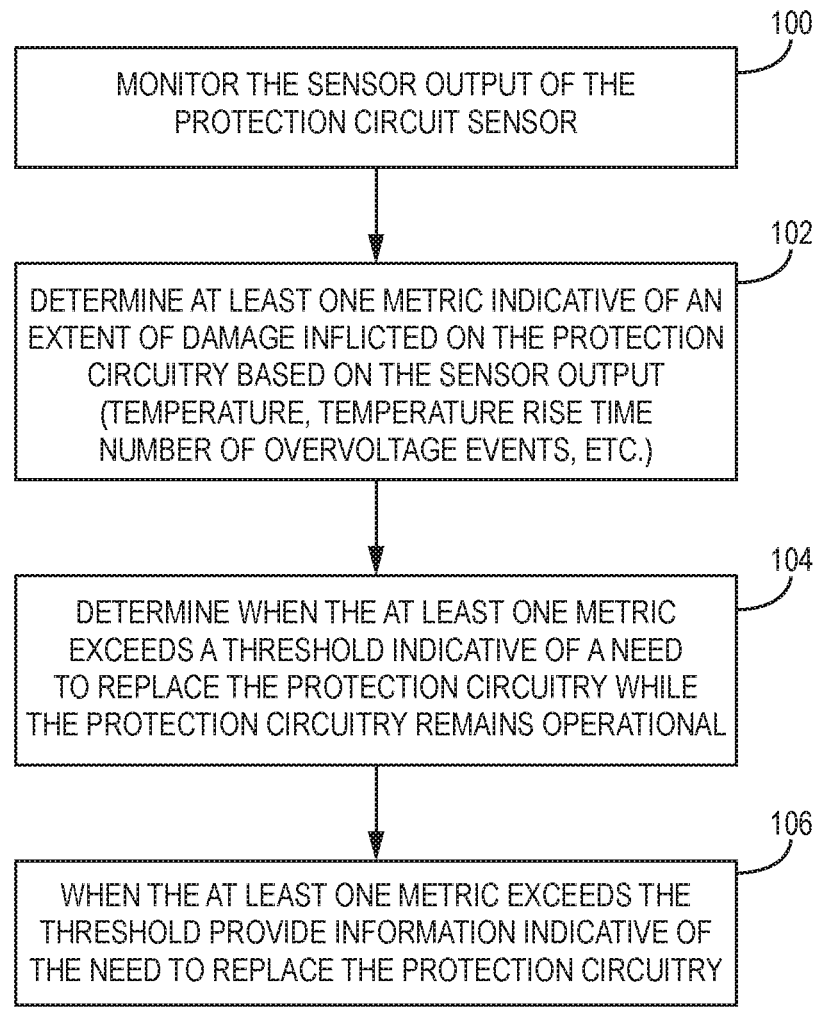

FIG. 4 a flow diagram illustrating operation of the monitoring electronics according to one embodiment.

Figure 5:
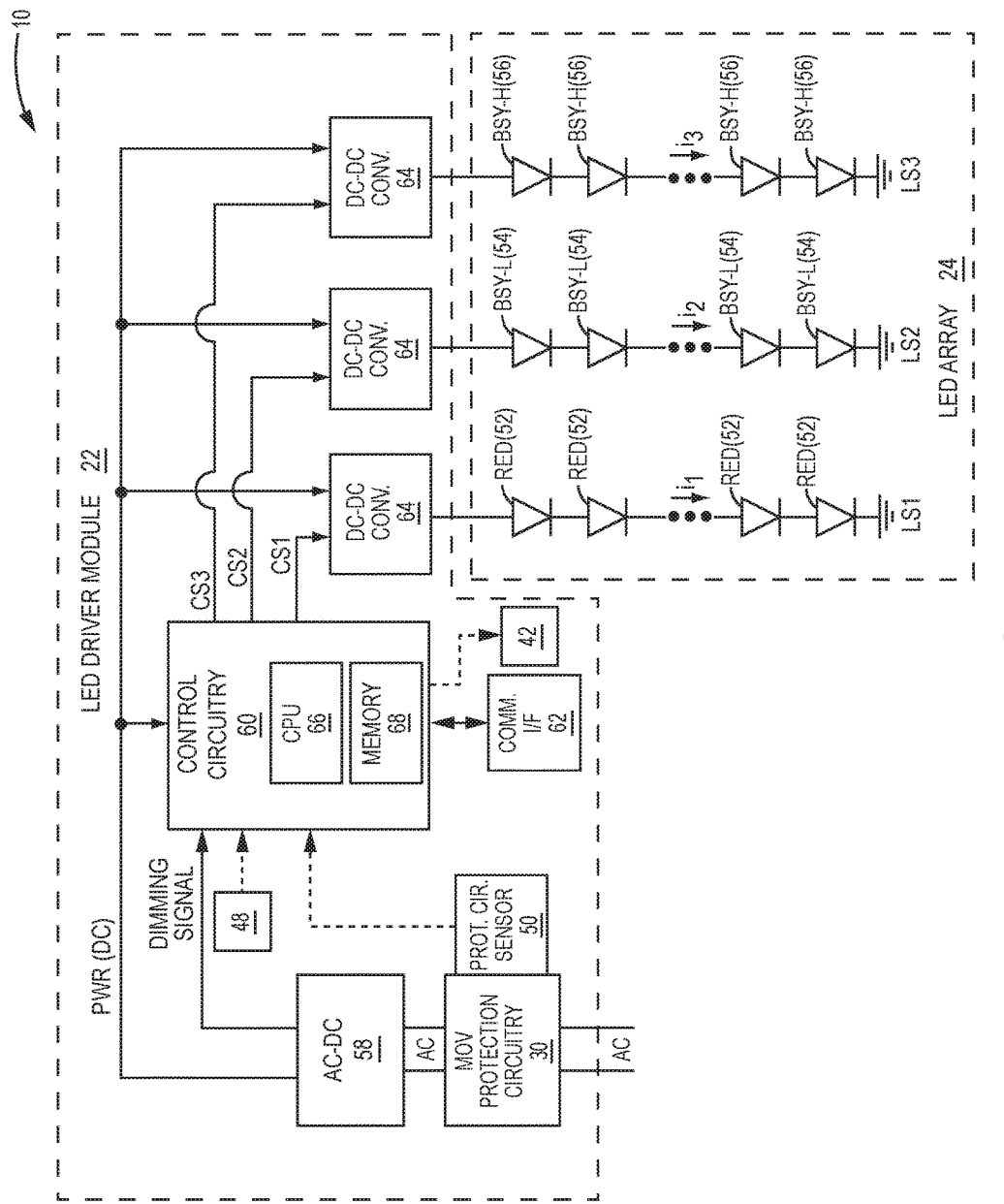

FIG. 5 is a schematic of a lighting fixture according to a second embodiment.

Figure 6:
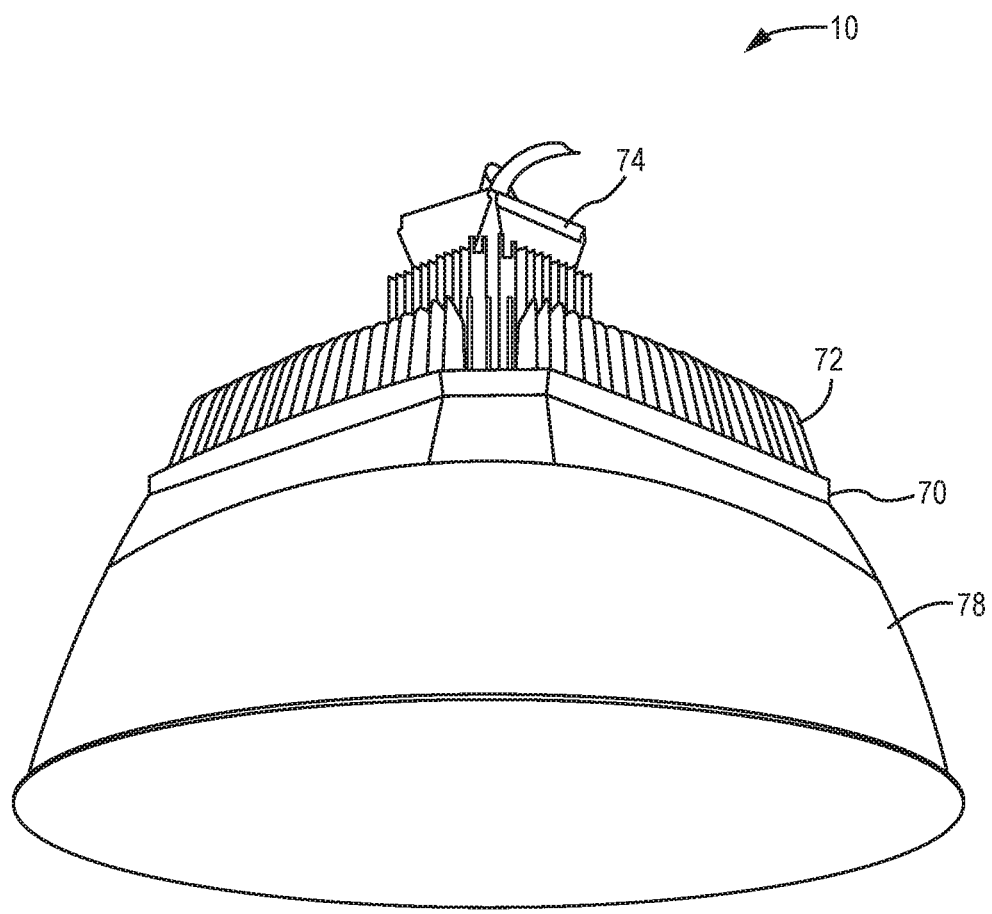
Figure 7:
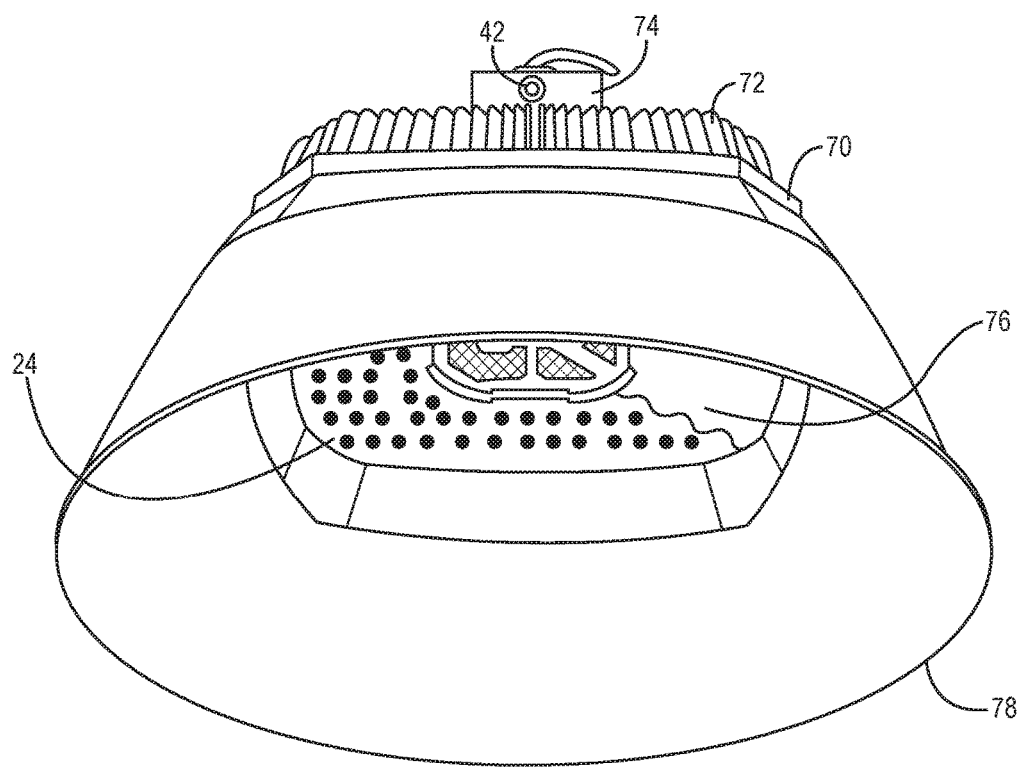

FIGS. 6 and 7 illustrate a lighting fixture according to a first embodiment.

Figure 8:
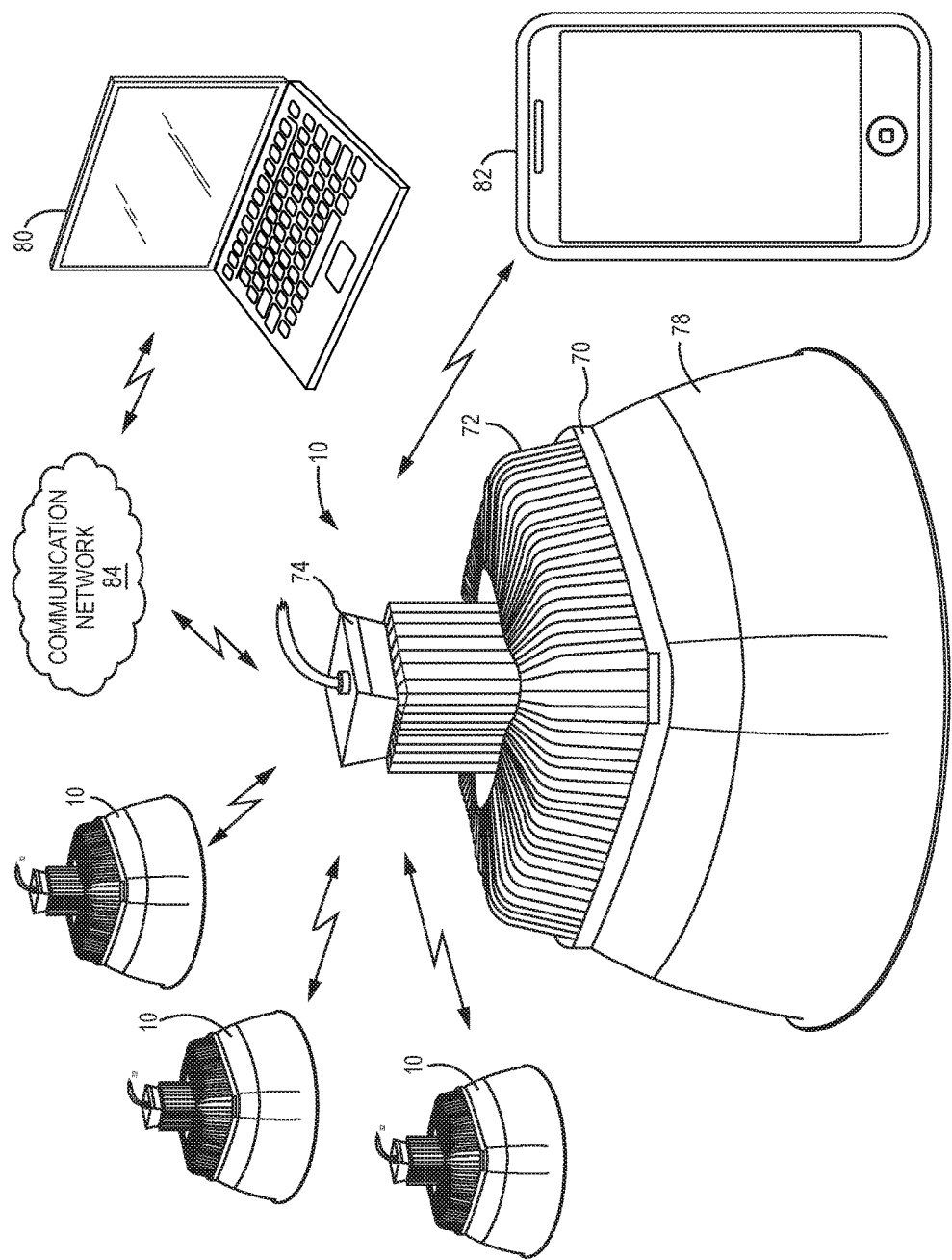

FIG. 8 illustrates a lighting fixture having wireless communication capabilities.

Figure 9:
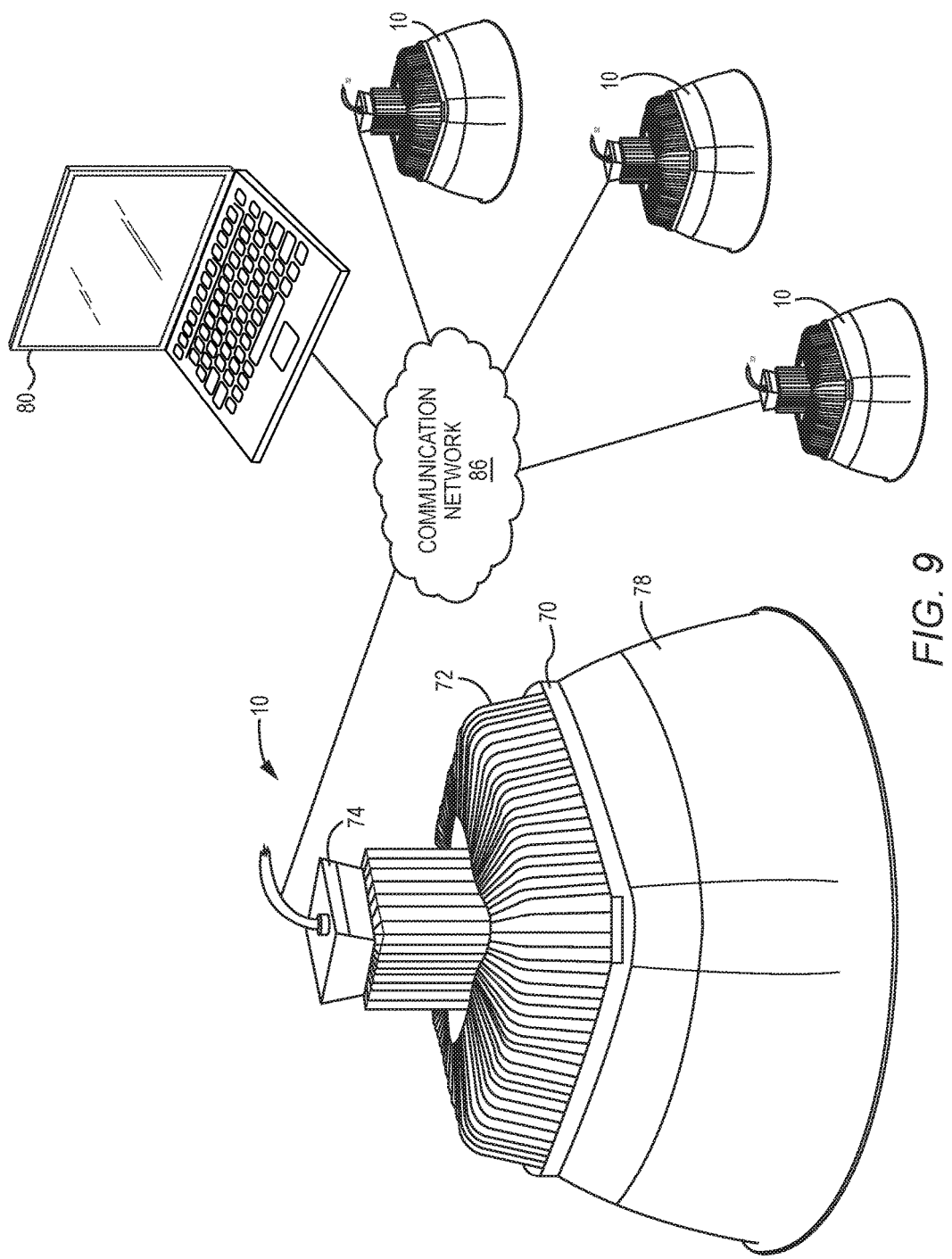

FIG. 9 illustrates a lighting fixture having wired communication capabilities.

Figure 10:
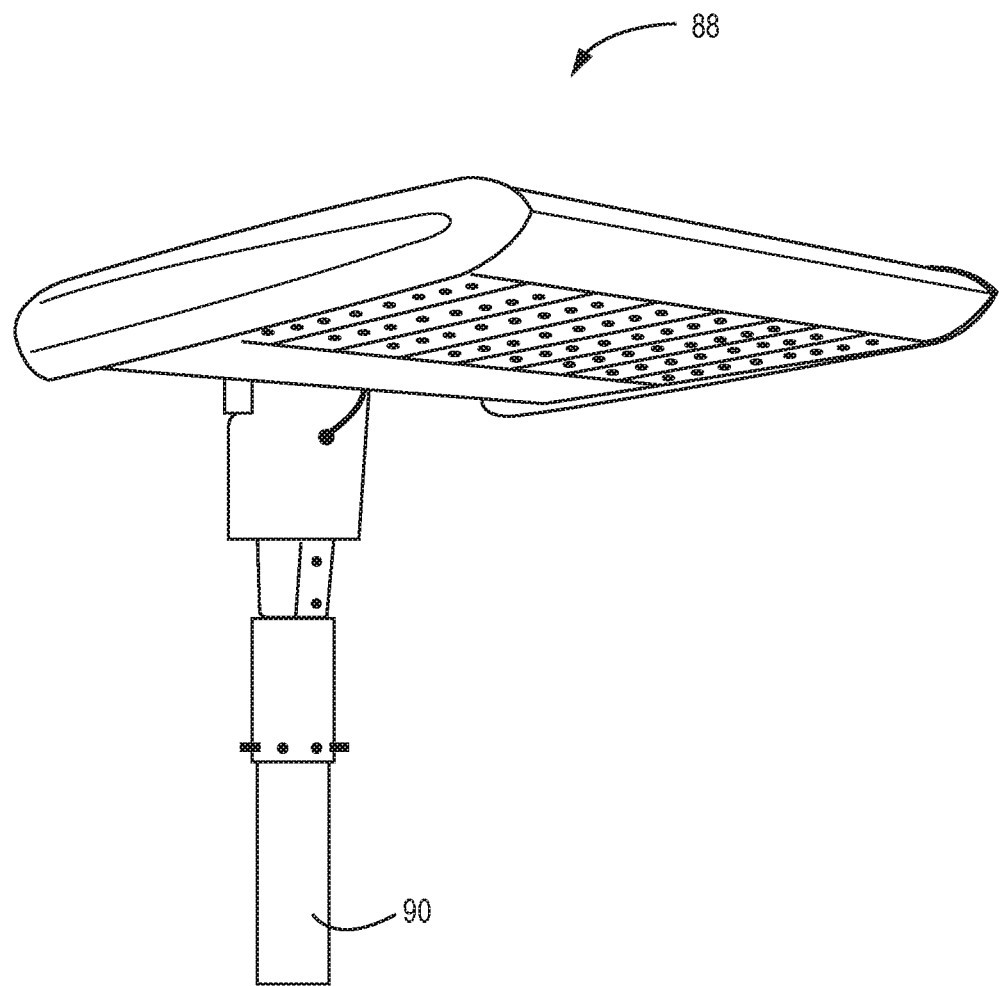
Figure 11:
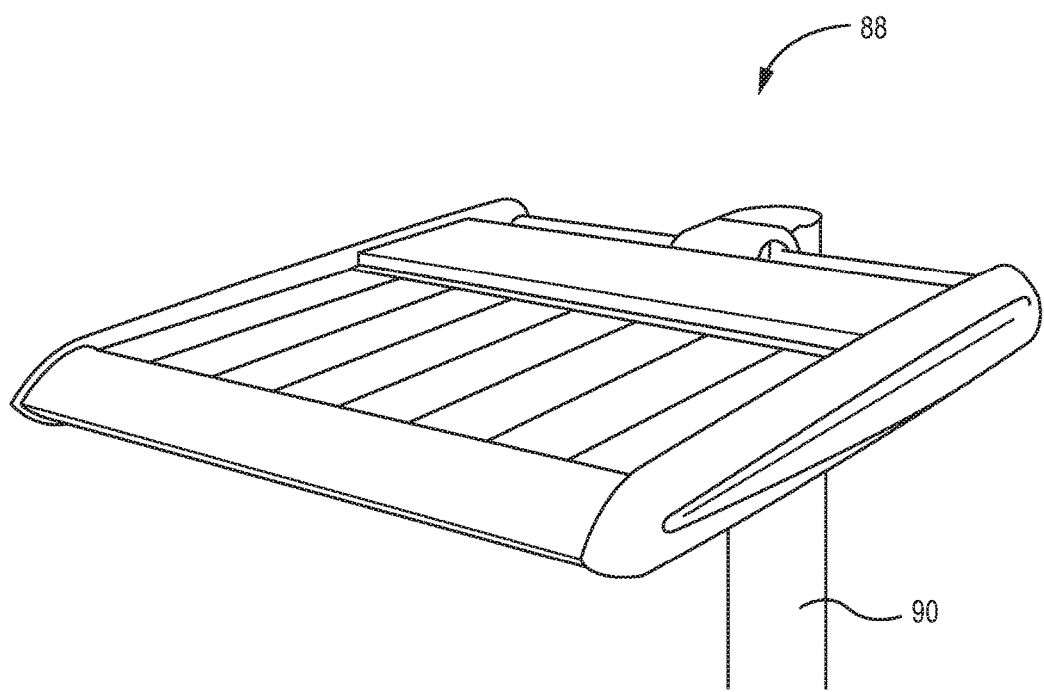

FIGS. 10 and 11 illustrate lighting fixtures according to a second embodiment.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
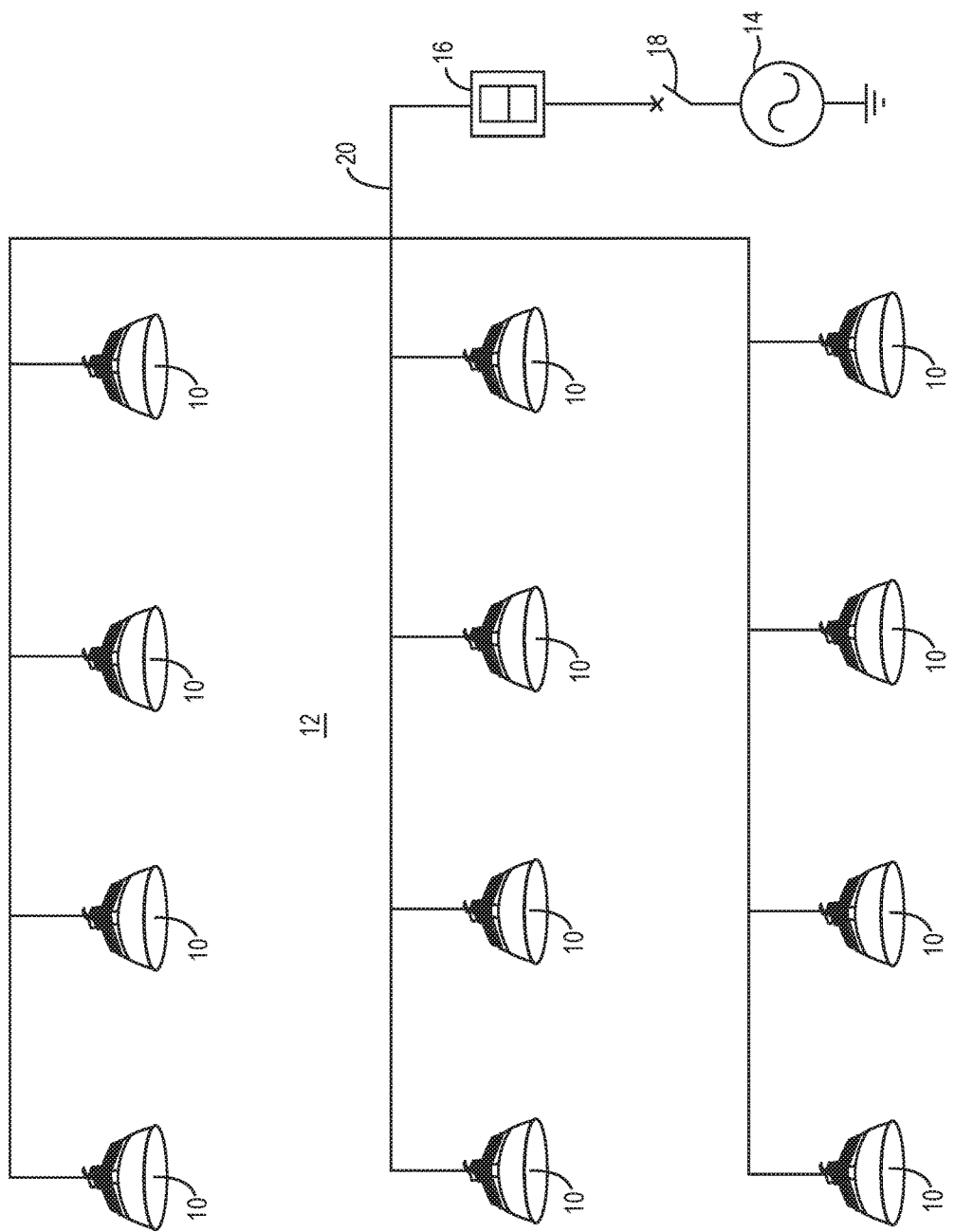
FIG. 1 illustrates a lighting network with multiple lighting fixtures, a wall controller, and circuit breaker.

With reference to FIG. 1, multiple lighting fixtures 10 reside in a lighting group 12. The lighting fixtures 10 of the lighting group 12 are LED-based and receive power from an AC source 14 via a wall controller 16 and a circuit breaker 18. The AC source 14 may be a traditional 120 volt (V), 240 V, or like power source, wherein the circuit breaker 18 is a normally closed switch, which opens when current flowing through the circuit breaker 18 exceeds a defined voltage threshold instantaneously or for a given amount of time. The wall controller 16 is effectively a switch that controls the supply of power to the lighting fixtures 10 of the lighting group 12. As those skilled in art will appreciate, the lighting group 12, wall controller 16, and circuit breaker 18 of FIG. 1 represent one electrical circuit 20 of many similar circuits provided in a residential, commercial, or industrial setting and receiving power from the AC source 14.

Figure 2:
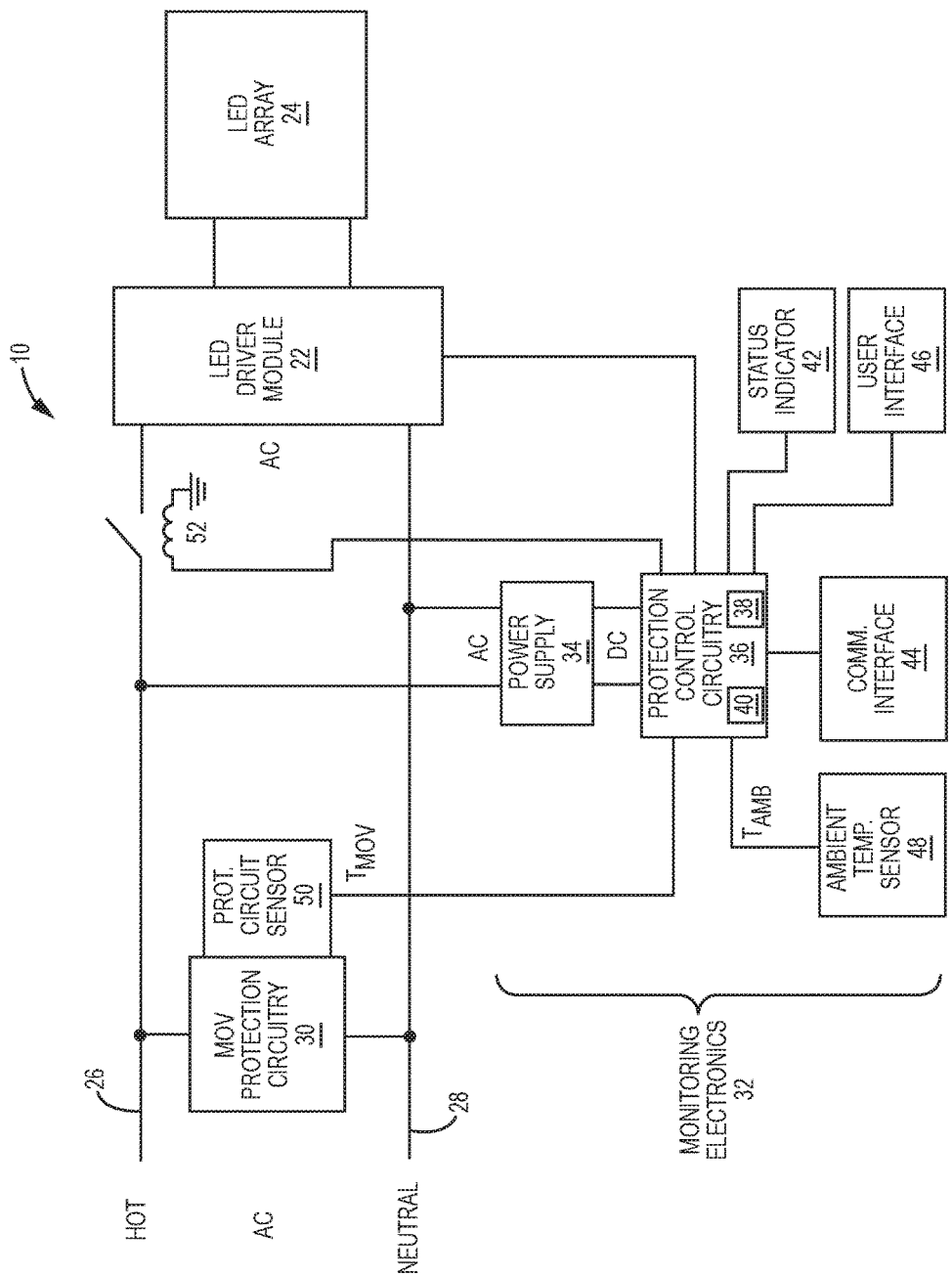
FIG. 2 is a schematic of a lighting fixture according to a first embodiment of the disclosure.

As illustrated in FIG. 2, each lighting fixture 10 includes a driver module 22 and an LED array 24. As detailed further below, the driver module 22 includes a power supply and driver electronics, which drive the numerous LEDs that form the LED array 24. The power supply converts incoming AC signals to one or more DC signals, which are required by the driver electronics. The driver electronics will drive the LEDs of the LED array 24 with pulse width modulated (PWM) or DC currents, depending on the application, to provide light for general illumination at the desired intensity, color, and color temperature.

For the embodiment illustrated in FIG. 2, each lighting fixture 10, or group of lighting fixtures 10, includes or is associated with surge suppression circuitry. For the illustrated embodiments, the surge suppression circuitry is referred to as MOV protection circuitry 30, which will include one or more MOVs placed in parallel with one another. The MOV protection circuitry 30 is coupled between the hot rail 26 and the neutral rail 28 of an AC power source. While an MOV-based surge suppression circuit is used for discussing the concepts described herein, other surge suppression circuits, such as silicon avalanche suppression diode, surge reduction filters, fusing, mechanical breakers, carbon block supressors and gas discharge tube supressors may benefit from the concepts described herein. Further, the MOV-based examples focus on overvoltage events, but those skilled in the art will recognize that the concepts described herein are applicable to any type of surge event, including overvoltage events, overcurrent events, and the like.

The MOV protection circuitry 30 functions to clamp voltages, which are presented between the hot rail 26 and the neutral rail 28 and exceed a specified threshold. For example, if the lighting fixtures 10 are designed to operate on voltages between 100 V and 130 V, the MOV protection circuitry 30 may be designed to clamp voltages that exceed 130 V down to 130 V in an effort to protect the LED driver module 22 and the LED array 24 from overvoltage events.

Unfortunately, the effectiveness of MOVs degrades with each overvoltage event to which they are subjected. Ultimately, the MOVs will fail after being subjected to a number of overvoltage events. The concepts described herein are directed to monitoring various metrics associated with the MOVs themselves and/or the overvoltage events and providing information relating the status of and/or when to change MOV protection circuitry 30 that is associated with a lighting fixture 10 or group thereof.

In a first embodiment, the MOV protection circuitry 30 is associated with monitoring electronics 32 that are configured to directly or indirectly monitor the status of the MOV protection circuitry 30 and/or the overvoltage events to which the MOV protection circuitry 30 is subjected. As illustrated, the monitoring electronics 32 include a power supply 34, which converts the AC power provided across the hot and neutral rails 26, 28 to the requisite DC power that is used by the protection control circuitry 36, which includes the requisite logic and/or processing circuitry 38 and memory 40 to provide the functionality described below. In one embodiment, the memory 40 stores software, which includes the requisite instructions for a microprocessor, microcontroller, or the like to provide the described functionality.

The protection control circuitry 36 may be associated with one or more of a status indicator 42, such as one or more LEDs, a communication interface 44, a user interface 46, an ambient temperature sensor 48, and protection circuit sensor 50, which is located and configured to provide information sufficient for the protection control circuitry 36 to monitor one or more metrics associated with the MOV protection circuitry 30. The metrics may include, but are not limited to, temperature of the MOV protection circuitry 30, current through the MOV protection circuitry 30, voltage across the MOV protection circuitry 30, and the like. If the protection circuit sensor 50 is provided to measure temperature associated with the MOV protection circuitry 30, the protection circuit sensor 50 may be an infrared (IR) temperature sensor, thermocoupler, thermistor, or the like. For measuring current through the MOV protection circuitry 30, the protection circuit sensor 50 may employ one or more inductors in which a magnetic field will induce currents in the inductors indicative of the currents flowing through the MOV protection circuitry 30.

The ambient temperature sensor 48 is located and configured to provide information sufficient for the protection control circuitry 36 to monitor the ambient temperature associated with the lighting fixture(s) 10. The ambient temperature sensor 48 is generally located far enough away from the MOV protection circuitry 30 to be no more than minimally affected by elevated temperatures of the MOV protection circuitry 30 during overvoltage events. In certain embodiments, ambient temperature information may be determined by the LED driver module 22 and provided to the protection control circuitry 36 of the monitoring electronics 32.

The protection control circuitry 36 may control the status indicator 42 to provide information bearing on the status of and/or need to replace the MOV protection circuitry 30. For example, the protection control circuitry 36 may turn on, dim, brighten, flash, and/or change the color of an LED of the status indicator 42 to provide information bearing on the status of and/or need to replace the MOV protection circuitry 30. The communication interface 44 may support wired and/or wireless communications with other entities. Via the communication interface 44, the protection control circuitry 36 may provide information bearing on the status of and/or need to replace the MOV protection circuitry 30 to other entities, receive instructions from these entities, receive software or firmware updates from these entities, and the like.

The user interface 46 may support providing information in an audible or visual form directly to a person, receiving information from a person, or a combination thereof. For example, the user interface 46 may include all or any combination of a speaker, alpha-numeric or graphical display, the status indicator 42, a microphone, button, keypad, touch screen, and the like to allow the protection control circuitry 36 to provide information to a person and/or allow the person to provide information to the protection control circuitry 36.

During operation, the protection control circuitry 36 may provide information to and/or control the LED driver module 22 of the lighting fixture 10 or group thereof. As will be described further below, the protection control circuitry 36 may be configured to send control information to the LED driver module 22 to cause the LED driver module 22 to drive the LED array in a manner that will convey the status of and/or need to replace the MOV protection circuitry 30. For example, the control information may result in the LED driver module 22 dimming, brightening, flashing, and/or changing the color or color temperature of the light emitted from the LED array 24. The protection control circuitry 36 could also cause the LED driver module 22 to turn the LED array 24 on or off.

The protection control circuitry 36 may also be configured to control other components associated with the lighting fixture 10 or group thereof. For example, one or more relays 52 may be controlled by the protection control circuitry 36 and provided between the AC power source and the LED driver module 22 in the hot rail 26 (as shown) and/or the neutral rail 28 (not shown). During over-voltage events; when the MOV protection circuitry 30 is still operational but should be replace due to prior overvoltage exposure(s); and/or after the MOV protection circuitry 30 has failed, the protection control circuitry 36 may open the relay(s) 52 to provide further protection during an overvoltage event or prevent use of the associated lighting fixture(s) 10 until the MOV protection circuitry 30 is replaced.

In certain embodiments, the MOV protection circuitry 30 is integrated into a lighting fixture 10, wherein the lighting fixture 10 is designed such that the MOV protection circuitry 30 is provided in a releasably engageable module that may be readily removed and replaced with another like module once the MOV protection circuitry 30 needs to be replaced or actually fails. The protection circuit sensor 50 may be incorporated in the module or may be permanently located in the lighting fixture 10, yet in close proximity to or adjacent to the module.

In yet other embodiments, the module will include not only the MOV protection circuitry 30 and the protection circuit sensor 50, but also some or all of the power supply 34, protection control circuitry 36, communication interface 44, status indicator 42, user interface 46, and ambient temperature sensor 48. In other words, the monitoring electronics 32, MOV protection circuitry 30, and/or the protection circuit sensor 50 may be provided in a releasably engageable module in any combination.

Figure 3:
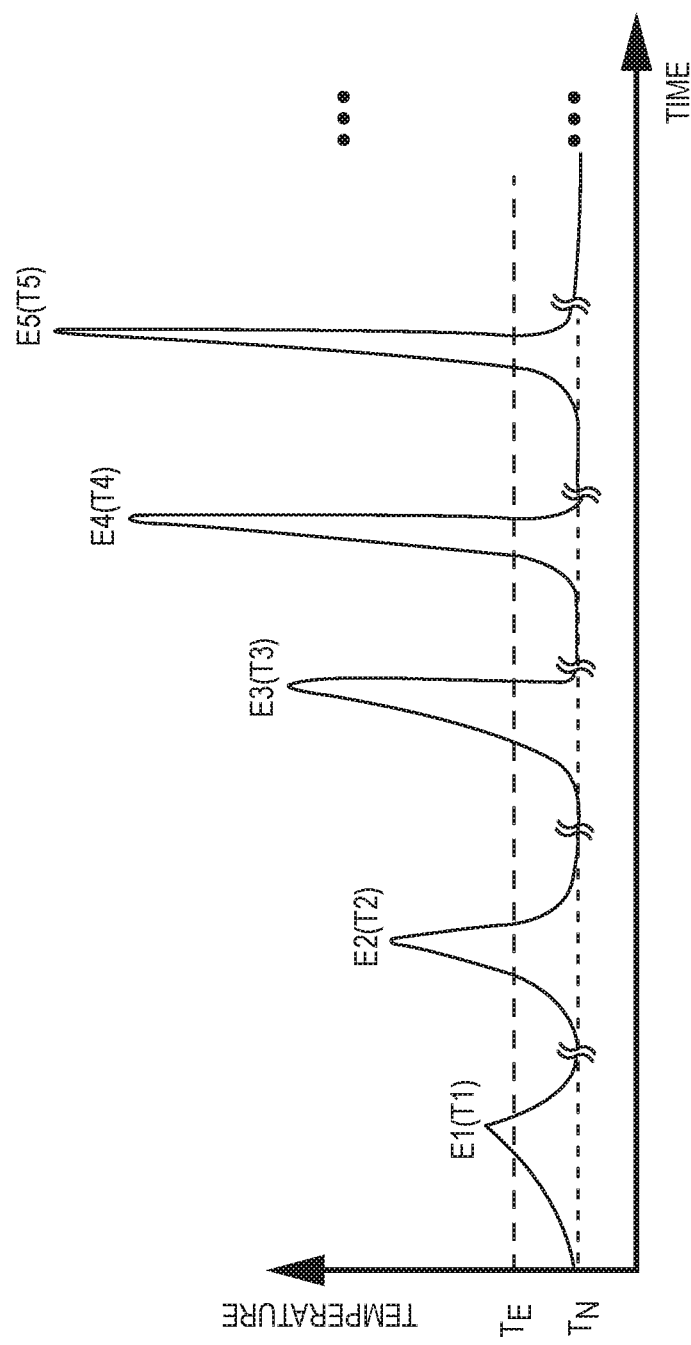
FIG. 3 is a graph of MOV temperature versus time for multiple overvoltage events.

FIG. 3 illustrates the negative impact of overvoltage events on an MOV. In particular, the temperature of an MOV over time for a series of five overvoltage events is shown. Assume that each overvoltage event is of the same general intensity and length. The first overvoltage event E1 has a relatively slow rise time and reaches a relatively low temperature T1. Each overvoltage event causes damage to the MOV. With each successive overvoltage event, the MOV is further damaged. As such, the second overvoltage event E2, which is generally the same as the first overvoltage event E1, causes the MOV to reach a higher temperature T2 with a faster rise time than that associated with first overvoltage event. The third, fourth, and fifth overvoltage events continue the pattern, wherein each successive overvoltage event causes the MOV to reach ever increasing temperatures T3, T4, and T5 with ever increasing faster rise times.

The protective capabilities of the MOV tend to decrease with each successive overvoltage event. Perhaps most significantly, the MOV will fail after being subjected to a relatively few number of overvoltage events. The number of overvoltage events prior to a failure can be as low as six to eight, often depending on the severity of the overvoltage event and the type of MOV. Upon failure, the MOV will generally present an open circuit, which will not affect normal operation, but will not function to clamp excessive voltages, thereby making the lighting fixture 10 vulnerable to being damaged by overvoltage events. As such, there is a need to assess or predict the relative health of the MOVs of the MOV protection circuitry 30 prior to the MOVs failing and to provide an alert indicating as much.

An exemplary process for operating the protection control circuitry 36 is provided in association with the flow diagram of FIG. 4. Initially, the protection control circuitry 36 will monitor the sensor output of the protection circuit sensor 50 on a continuous, periodic, or aperiodic basis (Step 100). In this example, the sensor is a temperature sensor, but other sensors such as current sensors and the like are applicable. Next, the protection control circuitry 36 will determine at least one metric indicative of an extent of damage inflicted on the MOV protection circuitry 30 based on the sensor output (Step 102). Numerous metrics are discussed further below. Based on the at least one metric, the protection control circuitry 36 will determine when the at least one metric exceeds a threshold indicative of a need to replace the MOV protection circuitry 30 while the MOV protection circuitry remains operational (Step 104). In other words, the protection control circuitry 36 is assessing information gathered from the sensor output to assess or predict the extent of damage inflicted by one or more overvoltage events.

The sensor output in this example corresponds to the temperature of the MOV protection circuitry 30. As indicated above, overvoltage events will trigger rises in temperatures above what is normal $T_N$ and usually well above a temperature threshold $T_E$, which is indicative of an overvoltage event. Exemplary, but non-limiting, temperature-based metrics that are indicative of damage inflicted on the MOV protection circuitry may correspond directly to or be a function of one or more of:

- a number of times a particular temperature has been exceeded;
- a defined temperature of the protection circuitry has been reached (or exceeded) during one or more of the surge events;
- a rise time of the temperature of the protection circuitry is less than a threshold during one or more of the surge events;
- an amount of time the temperature of the protection circuitry remains above a threshold temperature during one or more of the surge events;

the temperature of the protection circuitry remains above a set level after a surge event occurs, or after the surge event has ended; and an amount of temperature-related energy associated with one or more of the surge events.

The latter of which corresponds to an integral of temperature over time for a single event or over multiple events.

The temperature-based metrics may be analyzed individually or in combination in a variety of ways to determine whether the MOV protection circuitry 30 is damaged to a point of needing replacement. For example, the metric may be a function of a peak temperature reached by the protection circuitry during at least one of the surge events and a rise time of the temperature of the protection circuitry during at least one of the surge events. The function could be based on set thresholds being exceeded and/or differences between successive metrics exceeding or being less than set thresholds. A function of two or more of the metrics for a single overvoltage event or over multiple overvoltage events may be used to generate the metric. The functions may be linear, non-linear, or logic based.

In essence, the occurrence of elevated temperatures and/or the characteristics of the temperature curve can be analyzed to determine whether an overvoltage event occurred, and if an overvoltage event did occur, determine the characteristics of the overvoltage event, the damage inflicted on the MOV protection circuitry 30 by the overvoltage event, the cumulative damage inflicted on the MOV protection circuitry 30 by a single or multiple overvoltage events, and the like. The occurrence of an overvoltage event and/or characteristics including, but not limited to, those described above are considered metrics indicative of damage inflicted on the MOV protection circuitry 30.

Notably, the protection circuit sensor 50, when configured to monitor temperature, may be used in conjunction with the ambient temperature sensor 48. The temperature of the MOV protection circuitry 30 may need to be compared with ambient temperature to ensure that merely high operating temperatures do not trigger a false detection of an overvoltage event. As such, a comparison of the temperature of the MOV protection circuitry 30 and the ambient temperature may be provided in certain embodiments to ensure that overvoltage events are triggered when the temperature of the MOV protection circuitry 30 exceeds the ambient temperature and/or rises at a rate once above the ambient temperature by a given threshold.

As indicated above, the characteristics from or of the temperature curve associated with an overvoltage event may include or provide insight into the temperatures, temperature rise times, energies, and/or overall times associated with the overvoltage event. In certain instances, the shape of the temperature curve throughout the overvoltage event is very helpful in predicting the extent of damage suffered by the MOV protection circuitry 30 due to all of the preceding overvoltage events and/or the most recent overvoltage event. In general, the higher the peak and the faster the rise time of the temperature curve during the overvoltage event, the more damage the MOV protection circuitry 30 has sustained.

The protection control circuitry 36 may look at the temperature curve for the most recent overvoltage event, compare the most recent overvoltage event with one or more prior overvoltage events, or a combination thereof in determining the extent of damage to the MOV protection circuitry 30. The protection control circuitry 36 may solely consider a single metric for one or more overvoltage events or factor in a combination of metrics for one or more overvoltage events in assessing or predicting damage. For example, the protection control circuitry 36 may determine that the MOV protection circuitry 30 should be replaced solely based either on the number of overvoltage events exceeding a threshold number or a peak temperature associated with a single overvoltage event exceeding a defined threshold temperature. In other embodiments, a more complex function that takes into consideration multiple metrics over multiple overvoltage events is used to assess or predict damage.

Once the protection control circuitry 36 determines that there is sufficient damage to warrant replacement of the MOV protection circuitry 30, the protection control circuitry 36 will provide information indicative of the need to replace the MOV protection circuitry 30 (Step 106). As such, the information is provided prior to the MOV protection circuitry 30 actually failing. As indicated above, the information may be provided in a variety of ways. Further, the information may take the form of a simple alert or may include data pertaining to the damage to the MOV protection circuitry 30, the overvoltage events, and the like.

Examples of providing the information indicative of the need to replace the MOV protection circuitry 30 may include, but are not limited to, the following. The protection control circuitry 36 may trigger a visible alert by controlling the status indicator 42 in a defined manner. For example, the status indicator 42 may turn on, turn off, change colors, flash, or any combination thereof to effectively provide the information in a visible alert. Similarly, the protection control circuitry 36 may instruct the LED driver module 22 to control the LED array 24 in a defined manner, which may include turning on, turning off, flashing, dimming, brightening, changing colors, changing color temperatures, or any combination thereof. The protection control circuitry 36 may also cause information to be displayed on a display provided by the user interface 46.

Further, the protection control circuitry 36 may provide a simple alert, a complex set of data, or anything therebetween that is indicative of the need to replace the MOV protection circuitry 30 to remote entities via the communication interface 44 in a wired or wireless manner.

FIG. 5 illustrates an embodiment wherein the functionality of monitoring electronics 32 is incorporated in the LED driver module 22 of the lighting fixture 10. In the illustrated embodiment, the LED array 24 includes a mixture of LEDs of different colors. While those skilled in the art will recognize various color combinations, the following example employs red LEDs 52 that emit reddish light at a first wavelength, blue shifted yellow (BSY) LEDs 54 that emit yellowish/greenish light at a second wavelength, and BSY LEDs 56 that emit yellowish/greenish light at a third wavelength, which is different than the second wavelength. The LED array 24 may be divided into multiple strings of series-connected LEDs. In essence, LED string LS1, which includes a number of red LEDs 52, forms a first group of LEDs. LED string LS2, which includes BSY LEDs 54, forms a second group of LEDs. LED string LS3, which includes BSY LEDs 56, forms a third group of LEDs.

The LED driver module 22 controls the drive currents $i_1$, $i_2$, and $i_3$, which are used to drive the respective LED strings LS1, LS2, and LS3. The ratio of drive currents $i_1$, $i_2$, and $i_3$ that are provided through respective LED strings LS1, LS2, and LS3 may be adjusted to effectively control the relative intensities of the reddish light emitted from the red LEDs 52 of LED string LS1, the yellowish/greenish light emitted from the BSY LEDs 54 of LED string LS2, and the yellowish/greenish light emitted from the BSY LEDs 56 of LED string LS3. The resultant light from each LED string LS1, LS2, and LS3 mixes to generate an overall light output that has a desired color, correlated color temperature (CCT), and intensity, the latter of which may also be referred to a dimming level. As noted, the overall light output may be white light that falls on or within a desired proximity of the Black Body Locus (BBL) and has a desired CCT.

The number of LED strings LSx may vary from one to many and different combinations of LED colors may be used in the different strings. Each LED string LSx may have LEDs of the same color, variations of the same color, or substantially different colors. In the illustrated embodiment, each LED string LS1, LS2, and LS3 is configured such that all of the LEDs 52, 54, 56 that are in the string are all essentially identical in color. However, the LEDs 52, 54, 56 in each string may vary substantially in color or be completely different colors in certain embodiments. In another embodiment, three LED strings LSx with red, green, and blue LEDs may be used, wherein each LED string LSx is dedicated to a single color. In yet another embodiment, at least two LED strings LSx may be used, wherein the same or different colored BSY or blue shifted green (BSG) LEDs are used in one of the LED strings LSx and red LEDs are used in the other of the LED strings LSx. A single string embodiment is also envisioned, where currents may be individually adjusted for the LEDs of the different colors using bypass circuits or the like.

The LED driver module 22 includes AC-DC conversion circuitry 58, control circuitry 60, a communication interface (I/F) 62, and a number of current sources, such as the illustrated DC-DC converters 64. The AC-DC conversion circuitry 58 is configured to receive an AC signal (AC), rectify the AC signal, correct the power factor of the AC signal, and provide a DC power signal (PWR). The DC power signal may be used to directly or indirectly power the control circuitry 60 and any other circuitry provided in the driver module 22, including the DC-DC converters 64 and the communication interface 62.

The three respective DC-DC converters 64 of the LED driver module 22 provide drive currents $i_1$, $i_2$, and $i_3$ for the three LED strings LS1, LS2, and LS3 in response to control signals CS1, CS2, and CS3. The drive currents $i_1$, $i_2$, and $i_3$ may be pulse width modulated (PWM) signals or variable DC signals. If the drive currents $i_1$, $i_2$, and $i_3$ are PWM signals, the control signals CS1, CS2, and CS3 may be PWM signals that effectively turn the respective DC-DC converters 64 on during a logic high state and off during a logic low state of each period of the PWM signal. As a result, the drive currents $i_1$, $i_2$, and $i_3$ for the three LED strings LS1, LS2, and LS3 may also be PWM signals. The intensity of light emitted from each of the three LED strings LS1, LS2, and LS3 will vary based on the duty cycle of the respective PWM signals. The control circuitry 60 will adjust the duty cycle of the drive currents $i_1$, $i_2$, and $i_3$ provided to each of the LED strings LS1, LS2, and LS3 to effectively adjust the intensity of the resultant light emitted from the LED strings LS1, LS2, and LS3 while maintaining the desired CCT based on instructions from the control circuitry 60. If the drive currents $i_1$, $i_2$, and $i_3$ for the three LED strings LS1, LS2, and LS3 are variable DC currents, the control circuitry 60 generates control signals CS1, CS2, and CS3 that result in the DC-DC converters 64 outputting the drive currents $i_1$, $i_2$, and $i_3$ at the appropriate DC levels.

In certain instances, a dimming device, such as a wall controller 16, may control the AC power signal, provide a separate a 0-10 volt DC signal, or the like to the LED driver module 22. The AC-DC conversion circuitry 58 or other electronics may be configured to detect the relative amount of dimming associated with the AC power signal or 0-10 volt DC signal and provide a corresponding dimming signal (DIMMING SIGNAL) to the control circuitry 60 of the LED driver module 22.

The control circuitry 60 may include a central processing unit (CPU) 66, such as microprocessor or microcontroller, and sufficient memory 68 to store the requisite data and software instructions to enable the control circuitry 60 to function as described herein. The control circuitry 60 may interact with the communication interface 62 to facilitate wired or wireless communications with other lighting fixtures 10 or remote devices, as described above during the discussion of the communication interface 44.

When the terms "control system" or "control circuitry" are used in the claims or generically in the specification, the term should be construed broadly to include the hardware and any additional software or firmware that is needed to provide the stated functionality. These terms should not be construed as only software, as electronics are needed to implement control systems described herein. For example, a control system may, but does not necessarily, include the control circuitry 60, the DC-DC converters 64, the AC-DC conversion circuitry 58, and the like.

In this embodiment, the MOV protection circuitry 30 is provided just before the AC-DC conversion circuitry 58, which is effectively the power supply for the LED driver module 22. Just as described above, the MOV protection circuitry 30 resides between the hot and neutral rails 26, 28 of the AC supply and functions to protect the LED lighting fixture 10, and specifically the LED driver module 22, from overvoltage events. Further, the protection circuit sensor 50 is integrated with or proximately located to the MOV protection circuitry 30 and functions as described above.

As noted above, the primary difference between this embodiment and the embodiment of FIG. 2 is that the functionality of monitoring electronics 32 is incorporated in the LED driver module 22. The functionality of the protection control circuitry 36 is provided by the control circuitry 60 of the LED driver module. The functionality of the communication interface 44 is provided by the communication interface 62. The LED driver module 22 may be further equipped with the ambient temperature sensor 48 and the status indicator 42. In this configuration, the lighting fixture 10 of FIG. 5 can provide the same functionally as that of FIG. 2 without the need for redundancy in certain processing and communication electronics. The MOV protection circuitry 30 alone or in combination with the protection circuit sensor 50 may be packaged in a releasably engageable module to allow a module with damaged or failed MOV protection circuitry 30 to be readily replaced with a module having new, undamaged MOV protection circuitry 30.

While illustrated as being mounted on or in the lighting fixtures 10, the MOV protection circuitry 30 and the various components of the monitoring electronics may be mounted apart from, but electrically connected to the lighting fixture 10 through appropriate cabling. For example, the status indicator 42 could be tethered to the lighting fixture 10 to ensure that the status indicator 42 is exposed to the area being illuminated by the lighting fixture 10. The MOV protection circuitry 30 and the protection circuit sensor 50 may be located apart from the lighting fixture 10 to make it more accessible, to allow a single MOV protection circuit 30 to support multiple lighting fixtures 10, and the like.

Turning now to FIGS. 6 and 7, an exemplary lighting fixture 10 is illustrated. The illustrated lighting fixture 10 is modeled after an HXB series high bay/low bay lighting fixture that is manufactured by Cree, Inc. of Durham, N.C. The concepts described herein are applicable to any type of lighting fixture and for any type of lighting environment. Either of the embodiments described in association with FIGS. 2 and 5 may be incorporated into or with the lighting fixture 10. The lighting fixture 10 includes a frame 70 over which a heatsink 72 and an electronics housing 74 are mounted. The LED driver module 22, the MOV protection circuitry 30, the protection circuit sensor 50, and the monitoring electronics 32, if integrated within the lighting fixture 10, may be mounted in or on the electronics housing 74. FIG. 7 illustrates the status indicator 42 as an LED that is mounted on the electronics housing 74, according to one embodiment of the disclosure. The LED array 24 is mounted on a bottom side of the frame 70 and may be covered by a lens 76. As illustrated, a portion of the lens 76 is shown as being removed to expose the LED array 24. A reflector 78 may be provided about the LED array 24 to aid in directing and mixing light emitted from the LED array 24 for general illumination.

FIG. 8 illustrates an embodiment wherein, depending on the embodiment, the communication interface 44 of the monitoring electronics 32 (FIG. 2) or the communication interface 62 of the LED driver module 22 (FIG. 5) are capable of wirelessly communicating with any number of entities, such as other lighting fixtures 10, computing devices 80, and/or mobile devices 82, directly or indirectly via a communication network 84. Accordingly, virtually any type of remote device may be provided information, including alerts and/or metrics, indicative of the need to replace the MOV protection circuitry 30 prior to the MOV protection circuitry 30 failing. FIG. 9 illustrates an embodiment that is capable of wired communications with any number of entities, such as other lighting fixtures 10 and computing devices 80 over a wired communication network 86, such as an Ethernet network.

As noted above, the concepts described herein are applicable to virtually any type of lighting fixture or lighting environment. While the embodiments described above use lighting fixtures 10 configured for high bay and/or low bay applications, other embodiments may include outdoor lighting fixtures 88, which are mounted to poles 90, tenons, or the like, such as those illustrated in FIGS. 10 and 11. Regardless of the particular lighting environment, incorporation of concepts described herein allows protection circuits of various types to be effectively monitored for damage and provide information indicative of the need to replace the protection circuits in a number ways. Those skilled in the art will recognize improvements and modifications to the preferred embodiments of the present disclosure. All such improvements and modifications are considered within the scope of the concepts disclosed herein and the claims that follow.

What is claimed is:

1. A lighting fixture comprising;
a light source for general illumination;
an AC input associated with a first rail and a second rail;
protection circuitry coupled between the first rail and the second rail and configured to suppress surge events occurring at the first rail and the second rail;
a protection circuitry sensor associated with the protection circuitry and configured to provide a sensor output that monitors at least one characteristic associated with the protection circuitry; and
control circuitry configured to:
drive the light source;
monitor the sensor output;
determine at least one metric indicative of an extent of damage inflicted on the protection circuitry due to at least one surge event based on the sensor output;
determine when the at least one metric meets a threshold indicative of a need to replace the protection circuitry while the protection circuitry remains operational; and
when the at least one metric meets the threshold, provide information indicative of the need to replace the protection circuitry.

2. The lighting fixture of claim 1 wherein the at least one characteristic is temperature, and the sensor output is a function of a temperature of the protection circuitry.

3. The lighting fixture of claim 2 wherein:
the control circuitry is further configured to identify the surge events based at least in part on the sensor output;
the at least one metric is a function of a number of the surge events that have occurred; and
the threshold is a function of a number of surge events that must occur prior to proving the information indicative of the need to replace the protection circuitry.

4. The lighting fixture of claim 2 wherein the at least one metric is a function of a peak temperature reached by the protection circuitry during at least one of the surge events.

5. The lighting fixture of claim 4 wherein the at least one metric meets the threshold when the peak temperature is greater than a defined temperature.

6. The lighting fixture of claim 2 wherein the at least one metric is a function of a rise time of the temperature of the protection circuitry during at least one of the surge events.

7. The lighting fixture of claim 6 wherein the at least one metric meets the threshold when the rise time is less than a defined time period.

8. The lighting fixture of claim 2 wherein the at least one metric is a function of:
a peak temperature reached by the protection circuitry during at least one of the surge events; and
a rise time of the temperature of the protection circuitry during at least one of the surge events.

9. The lighting fixture of claim 8 wherein the at least one metric meets the threshold when the peak temperature is greater than a defined temperature and the rise time is less than a defined time period.

10. The lighting fixture of claim 8 wherein the at least one metric meets the threshold when the peak temperature is greater than a defined temperature or the rise time is less than a defined time period.

11. The lighting fixture of claim 2 wherein the at least one metric is a function of a number of times a particular temperature has been exceeded.

12. The lighting fixture of claim 11 wherein the at least one metric meets the threshold when the a number of times a particular temperature has been exceeded reaches a set value.

13. The lighting fixture of claim 2 wherein the at least one metric is a function of a defined temperature of the protection circuitry being reached or exceeded during at least one of the surge events.

14. The lighting fixture of claim 13 wherein the at least one metric meets the threshold when the defined temperature of the protection circuitry has been reached or exceeded a set number of times.

15. The lighting fixture of claim 2 wherein the at least one metric is a function of an amount of time the temperature of the protection circuitry remains above a threshold temperature during at least one of the surge events.

16. The lighting fixture of claim 2 wherein the at least one metric is a function of at least two of:
- a number of times a particular temperature has been exceeded;
- a defined temperature of the protection circuitry has been reached or exceeded during at least one of the surge events;
- a peak temperature reached by the protection circuitry during at least one of the surge events;
- a rise time of the temperature of the protection circuitry during at least one of the surge events; and
- an amount of time the temperature of the protection circuitry remains above a threshold temperature during at least one of the surge events.

17. The lighting fixture of claim 2 wherein the protection circuitry comprises at least one metal oxide varistor.

18. The lighting fixture of claim 2 wherein the protection circuitry comprises one or more metal oxide varistors.

19. The lighting fixture of claim 2 wherein the at least one metric is a function of an amount of time the temperature of the protection circuitry remains above a threshold temperature after at least one of the surge events occurs.

20. The lighting fixture of claim 2 wherein the at least one metric is a function of an amount of time the temperature of the protection circuitry remains above a threshold temperature after at least one of the surge events has ended.

21. The lighting fixture of claim 1 wherein the at least one characteristic is current flowing through the protection circuitry, and the sensor output is a function of the current flowing through the protection circuitry.

22. The lighting fixture of claim 1 further comprising a status indicator capable of providing a human perceptible signal, and wherein to provide the information indicative of the need to replace the protection circuitry, the control circuitry is further configured to provide the human perceptible signal via the status indicator to indicate the need to replace the protection circuitry.

23. The lighting fixture of claim 22 wherein the status indicator is an LED.

24. The lighting fixture of claim 1 wherein the surge events are overvoltage events.

25. The lighting fixture of claim 1 wherein to provide the information indicative of the need to replace the protection circuitry, the control circuitry is further configured to control the light source in a defined manner that is indicative of the need to replace the protection circuitry.

26. The lighting fixture of claim 1 further comprising a user interface capable of providing a human perceptible signal, and wherein to provide the information indicative of the need to replace the protection circuitry, the control circuitry is further configured to provide the human perceptible signal via the user interface to indicate the need to replace the protection circuitry.

27. The lighting fixture of claim 1 further comprising a communication interface capable of communicating in a wired or wireless manner with a remote entity, and wherein to provide the information indicative of the need to replace the protection circuitry, the control circuitry is further configured to transmit an alert that indicates the need to replace the protection circuitry to the remote entity via the communication interface.

28. The lighting fixture of claim 1 further comprising a communication interface capable of communicating in a wired or wireless manner with a remote entity, and wherein to provide the information indicative of the need to replace the protection circuitry, the control circuitry is further configured to transmit the information indicative of the need to replace the protection circuitry via the communication interface.

29. The lighting fixture of claim 1 wherein the protection circuitry is provided in a module that releasably engages the lighting fixture such that the module is readily replaceable with a new module.

30. The lighting fixture of claim 1 wherein the control circuitry is further configured to determine when the protection circuitry has failed based on the sensor output and provide an alert indicating that the protection circuitry has failed.

31. The lighting fixture of claim 1 wherein the control circuitry comprises a driver module that is configured to drive the light source, and monitoring electronics that are distinct from the driver module and configured to:
- monitor the sensor output;
- determine the at least one metric indicative of the extent of damage inflicted on the protection circuitry due to at least one surge event based on the sensor output;
- determine when the at one least metric meets the threshold indicative of the need to replace the protection circuitry while the protection circuitry remains operational; and
- when the at least one metric meets the threshold, provide the information indicative of the need to replace the protection circuitry.

32. The lighting fixture of claim 1 wherein the control circuitry comprises a driver module that is configured to:
- drive the light source:
- monitor the sensor output;
- determine the at least one metric indicative of the extent of damage inflicted on the protection circuitry due to at least one surge event based on the sensor output;
- determine when the at least one metric meets the threshold indicative of the need to replace the protection circuitry while the protection circuitry remains operational; and
- when the at least one metric meets the threshold, provide the information indicative of the need to replace the protection circuitry.

33. The lighting fixture of claim 1 wherein the protection circuitry comprises metal oxide varistors.

* * * * *